United States Patent Office 3,383,186
Patented May 14, 1968

3,383,186
PREPARATION OF SODIUM AND POTASSIUM ALUMINUM HYDRIDE
Paolo Chini and Agostino Baradel, Milan, and Chiara Vacca and Marcello de Malde, San Donato Milanese, Italy, assignors to SNAM S.p.A., Milan, Italy, a company of Italy
No Drawing. Filed Feb. 27, 1964, Ser. No. 347,705
Claims priority, application Italy, Feb. 27, 1963, Patent 688,540; Dec. 24, 1963, Patent 801,606
7 Claims. (Cl. 23—365)

ABSTRACT OF THE DISCLOSURE

Sodium or potassium aluminum hydrides of the formula $MeAlH_4$, where Me is sodium or potassium, are formed by heating under hydrogen pressure a suspension of sodium fluoride or potassium fluoride, as the case may be, and metallic aluminum in the presence of an organic dispersing medium selected from the group consisting of hydrocarbons, ethers and tertiary amines at temperatures from 75° C. to 300° C. and pressures of from 1 to 500 atmospheres.

---

It is known that sodium-aluminum-hydride $NaAlH_4$ and potassium-aluminum hydride $KAlH_4$ can be synthesized by one of the following reactions:

$$Na + Al + 2H_2 \rightarrow NaAlH_4$$
$$KH + Al + 1.5H_2 \rightarrow KAlH_4$$

Italian Patent No. 614,037 (Ethyl Corp.); Ashby: J. Inorg. Chem., 2, 499 (1963); Belgian Patent No. 600,051 (Metallgesellschaft); Clasen: Angewandte Chemie 73, 329 (1961). In any case if operating according to conventional technique one has to employ either an alkali metal or a hydride of such a metal together with aluminum and hydrogen. Such metal, or metal hydride, is not only costly but generally requires a particular technique in being handled.

Now we have surprisingly found that the formation of alkali metal aluminum hydrides is possible also according to a quite different reaction starting from a suitable salt of an alkali metal. Such a process, which more specifically consists in heating under pressure of hydrogen a suspension of a salt of an alkali metal and metallic aluminum in the presence of a suitable dispersing medium, forms the subject-matter of the instant invention.

The course of the reaction is summarized by the following scheme:

$$4Al + 6KF + 6H_2 \rightarrow 3KAlH_4 + K_3AlF_6$$

As a salt component of the reaction mixture, it is possible to employ potassium fluoride as well as sodium fluoride.

The reaction can be carried out in a grinding autoclave, for instance in a rotary autoclave containing iron balls. The reaction however takes place with excellent conversions also in the absence of a grinding action. Into that autoclave, both the alkali metal fluoride and the metallic aluminum are introduced in already dispersed shape, or they are dispersed starting from a coarser shape during the very reaction.

The alkali metal fluoride is accurately dehydrated prior to being introduced into the reaction system and preferably it is also finely ground. To attain these objects it suffices for instance to dry in a muffle at from 200 to 600° C. and then to grind in a ball mill or in a hammer mill.

In the case of commercial products containing hydration water such as $KF \cdot 2H_2O$, it is convenient at the beginning to eliminate most of the water, preferably at low temperature under vacuum, to avoid the melting of the product during the subsequent heating up to 500° C.

The aluminum to be employed should preferably be finely dispersed and exempt from oxide. A commercial powdery aluminum (average diameter $\leq 50\mu$) freshly prepared is normally pure enough. If one wants to employ a powder containing sensible quantities of oxide, said aluminum powder can be activated or deoxidized prior to utilizing it with the present process, but that activation or deoxidation is not essential. There are known methods of activating or deoxidizing aluminum, for instance it is possible to carry out moist grinding in the presence or in the absence of an aluminum alkyl, or it is possible to heat the aluminum with hydrogen and with an aluminum trialkyl at 100° to 150° C. and at 100 to 200 atm.

Generally it will be preferred to employ a molar alkali metal fluoride to aluminum ratio of from 1.5 to 1, but also much different ratios may be employed.

With the instant process it is possible also to employ aluminum in grains or in filings; in such a case the aluminum is employed in considerable excess and after separation from the product of reaction it is preferably recycled to the reactor.

Though the reaction can be carried out also in the absence of any catalysts, it has been found to be advantageous to add to the reaction system a small molar percentage (from 0.1 to 10% with respect to the metallic aluminum introduced) of compounds corresponding to the following general formula:

$$(Me^1Y_n)_x(Me^2Y_m)_y(L)_z$$

wherein:

$Me^1$ is an alkali metal or an alkaline earth metal;
$n$ is the valency of said metal $Me^1$
$Me^2$ is a metal of the 2nd, 3rd and 4th main group of the Periodic system
$m$ is the valency of said metal $M^2$
Y is selected from one or more of the following substituents: R, OR, H, $NR_2$, F, Cl, Br, I, CN, CNS, CNO; wherein R is an aliphatic organic radical, or a cycloaliphatic one or an aromatic one; with the condition that at least one of the groups Y is a group R, OR, $NR_2$ or H
L is a legant selected from the class of ethers or of tertiary amines
$z$ is an integer or a fractionary number or zero
$x$ is an integer or zero
$y$ is an integer In said general class of catalysts, the preferred catalysts are those in which $Me^2$ is Al or Zn. Examples of such catalysts are: AlEt$_2$F, AlEt$_3$·OEt$_2$, AlEt$_3$, Al(OPh)$_2$Cl, Al(OiPr)$_2$H, Al(OiPr$_3$, AlH$_2$NEt$_2$, NaEt·AlEt$_3$, KCl.AlEtCl$_2$ NaH.Al(OEt)$_3$, KF.(AlEt$_3$)$_2$, ZnEt$_2$, ZnEtI, NaH.(ZnEt$_2$)$_2$ (LiPh)$_3$.(ZnPh$_2$)$_3$, CaEt$_2$.ZnEt$_2$ and the like (Et=ethyl; nBu=n-butyl; Ph=phenyl; iPr=isopropyl).

Since those catalysts can also form in situ by action of suitable compounds upon metallic aluminum or upon its hydrides, it is apparent that another class of catalysts useful in the present invention is constituted by:

(a) organic compounds containing the OH-group, of the R—OH type;
(b) organic compounds containing halogens (Cl, Br, I) of the R—V type;

wherein the organic radical R is an alkyl, a cycloalkyl or an aryl radical and in which there may be present ether groups or tertiary amino groups.

Some examples of such compounds are listed here below: n-butanol, isopropanol, sec-butanol, allyl alcohol, 2-methyl-but-3-in-ol-2, benzyl alcohol ethylene glycol monomethyl ether, phenol, naphthol, paradiamethyl aminophenol, ethyl bromide, methallyl chloride, iodobenzene, monochloromethyl ether.

In some cases it may be advantageous to employ said organic compounds in admixture with hydrohalogenic acids, with halogens or with other halogenated means.

In general the reaction is conducted in the presence of an organic medium, liquid or liquefiable at the reaction temperature, in that way the reaction product is obtained as a fine dispersion or as a solution. As an organic medium, any liquid that does not react or that reacts very slowly with the reactants or with the reaction products, may be employed. For instance aliphatic hydrocarbons such as n-heptane, iso-octane, vaseline oil; cycloaliphatic hydrocarbons such as cyclohexane, decahydronaphthalene; aromatic hydrocarbons such as benzene, toluene, isopropyl benzene; ethers such as n-butyl ether, ethylene glycol of n-butyl ether, diethylene glycol dimethyl ether, anisole, tetrahydrofurane, dioxane; tertiary amines such as triethyl amine, N-ethyl piperidine, dimethyl aniline or their mixtures.

Some compounds containing the ether group may be particularly desirable when the reaction product is to be obtained in dissolved shape, in particular tetrahydrofurane and diethylene glycol dimethyl ether.

With these solvents, and specially with tetrahydrofurane, there takes however place a slow attack by the solvent which leads to a reaction product containing a certain amount of alkoxylic groups.

The reaction is generally carried out at from 75° C. to 300° C., the temperature range selected depending to great extent on the kind of liquid phase present.

Preferably operation is at from 120° C. to 220° C. In the presence of ethereal solvents, one attempts at avoiding elevated temperatures.

In general one operates in a range of pressures of from 1 to 500 atm.; preferably from 30 to 300 atm. Though the reaction takes place at 1 atm., it is preferable to operate at superatmospheric pressures, because the speed of reaction increases with growing pressure. If a non-solvent compound is employed as a reaction medium, there are obtained suspensions of complex hydrides of aluminum which are mixed with substantial amounts of the corresponding alkali metal fluoaluminate and with small amounts of non-transformed alkali metal fluoride and aluminum. Said suspensions are very useful and the presence of the by-products listed dose not disturb the further utilization of said suspensions. For example it is possible to transfer the hydrogen to compounds easily soluble as the following reactions show:

(a) 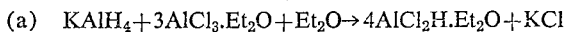

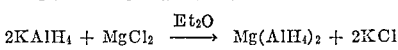

In that case there remains a residue of alkali metal fluoaluminate, fluoride and alkali metal chloride, that is separated quite easily from the ether solution containing the dissolved product.

That reaction is preferably carried out in ethyl ether at room temperature by mere stirring; the yields are of from 90 to 100%.

The dichloro-aluminum-hydride etherate is not only a valuable reducing means, but is also an important co-catalyst for polymerization. Or else it is possible to separate the complex aluminum hydride by means of extraction by a suitable solvent, for instance by tetrahydrofurane. From such tetrahydrofuranic solutions the product can then be precipitated by addition of ethyl ether, or another non-solvent.

The following examples are illustrative of the present process.

Example 1

Into an autoclave of 517 cc. volume there are introduced 18 balls of 20 mm. diameter and then in nitrogen atmosphere 9.7 g. of commercial aluminum powder (previously deoxidized by heating with AlEt$_3$ to 150° C. at 150 atm. of H$_2$), 33.8 g. of anhydrous KF (dried in a muffle at 500° C.) and ground in a ball mill, and 200 cc. of pure diethylene glycol dimethyl ether. Then hydrogen is compressed up to 118 atm. and the whole is heated at 125° C. for 50 hours. After cooling the pressure amounts to 93 atm. and the transformation calculated on the basis of the pressure drop is 40% of the metallic aluminum introduced.

The reaction product is filtered and then concentrated to a volume about half the original. By addition of 3 volumes of ethyl ether one obtains a white precipitate and with the analytical data corresponds a KAlH$_4$ with about 10% of oxyalkyl groups bonded to aluminum, as impurity. The X-ray examination of the insoluble residue shows that this is a mixture of K$_3$AlF$_6$, KF and Al.

Example 2

Into the same autoclave of the preceding example are introduced in nitrogen atmosphere 7.9 g. of deoxidized aluminum powder, 26.2 g. of ground anhydrous KF, 200 cc. of pure diethylene glycol dimethyl ether and 5 cc. of anhydrous triethyl amine. Then hydrogen is compressed to 136 atm. and the whole is heated for 37 hours at 115-125° C. The diminution of pressure is of 24 atm., equivalent to a 51.5% transformation calculated in the aluminum introduced. The suspension coming from the autoclave is filtered and the filtrate is concentrated to a volume of about 60 cc. and is then treated with 200 cc. of anhydrous diethyl ether. A white precipitate is obtained having a composition similar to the prior precipitate and whose X-ray spectrum shows to be the same product of the preceding example, but obtained at a higher degree of purity.

Example 3

Into the same autoclave and with the modalities described above, there are introduced 6.7 g. of deoxidized aluminum powder, 32.2 g. of ground anhydrous KF and 200 cc. of anhydrous toluene. Then hydrogen is compressed to 143 atm. and heating is effected at 190-210° C. for 40 hours. The diminution of pressure is of 17 atm. The suspension coming from the autoclave is filtered, the residue on the filter is washed with ether and is then dried in vacuo. That residue yields by decomposition with 2-ethyl-hexyl alcohol about 50 N cc. of hydrogen per gramme; the X-ray spectrum confirms that it contains KAlH$_4$ and K$_3$AlF$_6$.

Example 4

Into the same autoclave and with the modalities described above, there are introduced 10.6 g. of deoxidized aluminum powder, 36.0 g. of anhydrous ground KF, 200 cc. of anhydrous toluene and 2.9 cc. of triethyl aluminum. Then hydrogen is compressed to 140 atm. and heating is effected for 2 hours at 130 to 160° C. The pressure diminishes by 47 atm. equivalent to a transformation of 84%. The suspension coming from the autoclave is filtered, the residue is washed with n-heptane and is then vacuum-dried. In the filtrate is present the total of the triethyl aluminum introduced. The solid residue liberates 420 N cc. of hydrogen per gramme by treatment with 2-ethyl-hexyl alcohol, the X-ray spectrum confirms the presence of $KAlH_4$ and $K_3AlF_6$. Of this residue, 22 g. (equivalent to 0.205 g. of H atoms) are suspended in 150 cc. of anhydrous diethyl ether, operating in nitrogen atmosphere, and are treated under stirring with 230 cc. of an ether solution of $AlCl_3$ containing 0.46 g. of Cl atoms. The mass is filtered and washed with ether, the filtrate contains 0.185 g. of H atoms (equal to 90% of theory) in the shape of $AlCl_2H.Et_2O$.

Example 5

Into the same autoclave by the usual handling there are introduced 8.35 g. of deoxidized Al powder, 22.8 g. of ground anhydrous NaF, 200 cc. of anhydrous toluene and 2.0 cc. of aluminum triethyl. Then hydrogen is compressed to 151 atm. and heating is effected at 150° C. for 15 hours. Result is absorption of 28 atm. The suspension coming from the autoclave is filtered and the residue in the filter is washed with n-heptane and is then vacuum-dried, it amounts to 26.7 g. and is equivalent to 85% of the weight introduced, the difference being constituted by mechanical losses. That residue liberates 350 N cc. of hydrogen per gram by treatment with 2-ethyl-hexyl alcohol. The X-ray analysis confirms the presence of $NaAlH_4$ and of $Na_3AlF_6$. With tetrahydrofurane are extracted 4.1 g. of such dry solid product; after concentrating and precipitating with ethyl ether, 0.8 g. of $NaAlH_4$ are obtained (92% of theory).

Example 6

Into the same autoclave, by the same modalities, are introduced 34.1 of powdery Al of the trade, neither activated nor deoxidized. Then 113.6 g. of ground anhydrous KF, 200 cc. of toluene and 5.0 cc. of $AlEt_3$. Hydrogen is compressed (containing 4% of nitrogen) to 250 atm. and heating is effected to 160–170° C., interrupting twice to introduce further 70 atm. of hydrogen. Total heating was effected for 22 hours and 153 atm. of hydrogen was absorbed, equivalent to a 76% transformation. The suspension discharged from the autoclave is filtered and the residue is washed and dried. It contains 420 N cc. of $H_2$ developable with alcohol per gram.

Example 7

The test of Example 4 is repeated in a glass flask at ordinary pressure for 12 hours, and employing decalin as a solvent, yielding a product the X-ray analysis of which has confirmed the presence of $KAlH_4$.

Examples 8 to 17

Into an oscillating autoclave with 538 cc. free volume there are introduced 13.5 g. of deoxidized aluminum powder treated with $AlEt_3$ and $H_2$ at 150° C. and having a specific surface of about 7500 sq. cm./g. There are added 29 g. of anhydrous KF of the trade re-dried in a muffle at 500° C. and then a toluenic solution of the catalyst; hydrogen is compressed to 120 atm. The autoclave is heated to 165° C. The results obtained with various catalysts are as follows:

| Catalyst employed | Millimoles of catalyst | Time of reaction in minutes | Conversion percent based on pressure drop |
|---|---|---|---|
| None | | 1,080 | 0 |
| $AlEt_3$ | 29 | 200 | 97 |
| $Al(isobutyl)_3$ | 29 | 240 | 30 |
| $AlEt_2Cl$ | 29 | 360 | 81 |
| $Al(O\ isopropyl)_3$ | 30 | 1,100 | 86 |
| $NaAlEt_4$ | 20 | 1,020 | 60 |
| $ZnEt_2$ | 46 | 270 | 98 |
| n-Butanol | 90 | 1,150 | 38 |
| Phenol | 100 | 1,100 | 57 |
| Ethyl bromide | 90 | 950 | 64 |

Example 18

An autoclave is employed having a free volume of 1650 cc., which is equipped with a turbine stirrer capable of turning at the speed of 1140 revolutions per minute. There are introduced into the autoclave 26.2 g. of the same activated Al of Examples 8 to 17 and 78 g. of the same KF. There are added 300 cc. of toluene and 11 millimoles of $AlEt_3$. $H_2$ is compressed to 50 atm. By circulating hot oil, the autoclave is heated up to 185° C. in 20 minutes; the pressure amounts to 61.5 atm. In 100 minutes the pressure diminishes to 32 atm. and then in further 300 minutes it descends down to 26.5 atm. After cooling, the reaction product is filtered; in the toluenic solution there is determined the quantity of Al—H, Al—OEt and Al—Et bonds present; this amounts to 66% of the Al—$Et_3$ introduced. The analysis of the solid by means of volumetry corresponds to a conversion in $KAlH_4$ of 75%.

What is claimed is:

1. A process for preparing hydrides of the formula $MeAlH_4$ wherein Me is sodium or potassium, comprising heating under hydrogen pressure aluminum and an alkali compound selected, correspondingly, from the group consisting of sodium fluoride and potassium fluoride, and in the presence of a dispersing medium.

2. A process according to claim 1, wherein the alkali metal fluoride is accurately dehydrated and the fluoride and metallic aluminum are reacted in the dispersed state in an organic suspension medium, which is liquid under the reaction conditions, selected from the group consisting of hydrocarbons, ethers and tertiary amines, the reaction being conducted at temperatures of from 75 to 300° C. and pressures of from 1 to 500 atm.

3. A process according to claim 2, wherein the aluminum is powdery metallic aluminum and is reacted with potassium fluoride, the reaction medium being selected from benzene, toluene, and diethylene glycol dimethyl ether, and small amounts of aluminum triethyl are added in the presence of hydrogen under a pressure of from 30 to 200 atm.; the reaction temperature being then 120–230° C.

4. A process according to claim 2, wherein sodium fluoride is reacted with powdery metallic aluminum in the presence of aluminum triethyl and of hydrogen under a pressure of from 30 to 200 atm. at a temperature of from 120 to 230° C., the reaction medium being toluene.

5. A process for preparing hydrides of the general formula $MeAlH_4$ wherein Me is sodium or potassium, comprising reacting, in the presence of a catalyst, an alkali metal fluoride, selected from the group consisting of sodium and potassium fluoride, with metallic aluminum, under hydrogen pressure, in the dispersed state in an organic reaction medium, which is liquid at reaction conditions, at temperatures of from 75 to 300° C. and pressures of from 1 to 500 atm., wherein the catalyst is selected from compounds belonging to one of the following two classes:

(1)  $(Me^1Y_n)_x(Me^2Y_m)_y \cdot (L)_z$ (2)  R—X wherein:
- $Me^1$ is an alkali metal or an alkaline earth metal;
- $Me^2$ is a metal of the 2nd, 3rd or 4th group of the periodic system;
- Y is selected from one or more of the following substituents: R, OR, H, $NR_2$, F, Cl, Br, I, CN, CNS, CNO; at least one of the Y being a group R, OR $NR_2$ or H;
- X is OH or a halogen;
- R is an aliphatic, cycloaliphatic or aromatic organic radical;
- L is a legant compound selected from the group consisting of ethers and of tertiary amines;
- $n$ is the valency of $Me^1$;
- $m$ is the valency of $Me^2$;
- $z$ is an integer, a fractional number, or zero;
- $x$ is an integer or zero;
- $y$ is an integer.

6. A process according to claim 5, wherein $Me^2$ is selected from zinc and aluminum.

7. A process according to claim 5, wherein the catalyst is selected from class 2 and wherein operation is carried out in the presence of halogenating means, selected from the group consisting of hydrohalogenic acids and halogens.

References Cited
FOREIGN PATENTS

| | | |
|---|---|---|
| 333,305 | 2/1921 | Germany. |
| 833,646 | 4/1960 | Great Britain. |

OTHER REFERENCES

Zakharkin et al., "Doklady Akademiia Nauk SSSR," vol. 145, pp. 793–796 (August 1962).

MILTON WEISSMAN *Primary Examiner.*